United States Patent
Vujcic

(10) Patent No.: US 8,908,714 B2
(45) Date of Patent: Dec. 9, 2014

(54) SELECTIVE DISCONTINUOUS RECEPTION METHOD AND RELATED SYSTEM AND DEVICE

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 248 days.

(21) Appl. No.: 13/638,584

(22) PCT Filed: Mar. 22, 2011

(86) PCT No.: PCT/KR2011/001946
§ 371 (c)(1),
(2), (4) Date: Dec. 18, 2012

(87) PCT Pub. No.: WO2011/122780
PCT Pub. Date: Oct. 6, 2011

(65) Prior Publication Data
US 2013/0100871 A1 Apr. 25, 2013

Related U.S. Application Data

(60) Provisional application No. 61/319,829, filed on Mar. 31, 2010.

(51) Int. Cl.
*H04B 7/212* (2006.01)
*H04Q 11/04* (2006.01)
*H04B 7/26* (2006.01)

(52) U.S. Cl.
CPC ............. *H04Q 11/04* (2013.01); *H04B 7/2643* (2013.01)
USPC .......................................... 370/458; 370/347

(58) Field of Classification Search
CPC ................... H04L 2012/5608; H04L 1/0025; H04W 84/12; H04W 88/08; H04W 80/04; H04W 84/18; H04W 88/06; H04W 74/08; H04W 72/0446; H04B 7/2643; H04B 7/2656; H04B 7/212
USPC .............. 370/310.2, 314, 338, 337, 321, 322, 370/347, 328, 349, 329
See application file for complete search history.

(56) References Cited

U.S. PATENT DOCUMENTS

| | | | |
|---|---|---|---|
| 2011/0002281 A1* | 1/2011 | Terry et al. .................... | 370/329 |
| 2012/0002635 A1* | 1/2012 | Chung et al. .................. | 370/329 |
| 2012/0178445 A1* | 7/2012 | Dalsgaard et al. ............ | 455/434 |

FOREIGN PATENT DOCUMENTS

| | | |
|---|---|---|
| JP | 2009-232463 | 10/2009 |
| KR | 10-2008-0097898 | 11/2008 |
| KR | 10-2009-0084701 | 8/2009 |

*Primary Examiner* — Brenda H Pham
(74) *Attorney, Agent, or Firm* — Mckenna Long & Aldridge LLP

(57) ABSTRACT

Selective DRX method on multiple CCs for a UE (320), at least one CC being configured with a PDCCH received from a base station (310) and arranged for scheduling resources on a physical shared channel to the UE on said at least one CC respectively and/or on at least one other CC, each CC having a respective active time during which the UE monitors or would monitor the reception of a PDCCH on said CC respectively if said CC is or was configured with a PDCCH. It is determined whether at least one CC is configured with a PDCCH arranged for scheduling resources on at least one other CC. If it is, the active time of said at least one CC is adjusted to the longest active time of said at least one CC and said at least one other CC. Otherwise, independent active times are maintained for all CCs respectively.

10 Claims, 4 Drawing Sheets

SELECTIVE DISCONTINUOUS RECEPTION METHOD AND RELATED SYSTEM AND DEVICE

This Application is a 35 U.S.C. §371 National Stage Entry of International Application No. PCT/KR2011/001946, filed Mar. 22, 2011 and claims the benefit of U.S. Provisional Application No. 61/319,829, filed Mar. 31, 2010, all of which are incorporated by reference in their entirety herein.

TECHNICAL FIELD

The present invention relates to carrier aggregation management in a radiocommunication system.

BACKGROUND ART

Many different types of radiocommunication systems (i.e. networks) exist. GSM, UMTS, LTE and LTE-advanced are non-limiting examples of such radiocommunication systems.

FIG. 1 is a block diagram showing a radiocommunication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user data or control data can be used between BSs 20 (in the present document, the term "data" is used as a synonymous for "traffic" and does not imply any limitation as to the nature of such data, which can refer e.g. to user traffic or control traffic i.e. signaling). The BSs 20 are interconnected with each other by means of an X2 interface. The BSs 20 are also connected by means of the S1 interface to the EPC (Evolved Packet Core). They may interface to the aGW (E-UTRAN Access Gateway) via the S1. In the example shown in FIG. 1, the BSs 20 are more specifically connected to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

FIG. 2 gives an overview of the E-UTRAN architecture where:

eNB, aGW Control Plane and aGW User Plane boxes depict the logical nodes;

The boxes within the eNB box from RRC to Inter Cell RRM as well as the boxes SAE Bearer Control and MM Entity within the aGW Control Plane box depict the functional entities of the control plane; and The boxes within the eNB box from PHY to RLC depict the functional entities of the user plane.

Functions agreed to be hosted by the eNB are: Selection of aGW at attachment; Routing towards aGW at RRC activation; Scheduling and transmission of paging messages; Scheduling and transmission of BCCH information; Dynamic allocation of resources to UEs in both uplink and downlink; The configuration and provision of eNB measurements; Radio Bearer Control; Radio Admission Control; Connection Mobility Control in LTE_ACTIVE state.

Functions agreed to be hosted by the aGW are: Paging origination; LTE_IDLE state management; Ciphering of the user plane; PDCP; SAE Bearer Control; Ciphering and integrity protection of NAS signaling.

FIG. 3 shows the user-plane protocol stack for E-UTRAN.

RLC (Radio Link Control) and MAC (Medium Access Control) sublayers (terminated in eNB on the network side) perform the functions such as Scheduling, ARQ (automatic repeat request) and HARQ (hybrid automatic repeat request).

PDCP (Packet Data Convergence Protocol) sublayer (terminated in aGW on the network side) performs for the user plane functions such as Header Compression, Integrity Protection, Ciphering.

FIG. 4 shows the control-plane protocol stack for E-UTRAN. The following working assumptions apply.

RLC and MAC sublayers (terminated in eNB on the network side) perform the same functions as for the user plane;

RRC (Radio Resource Control) (terminated in eNB on the network side) performs the functions such as: Broadcast; Paging; RRC connection management; RB control; Mobility functions; UE measurement reporting and control.

PDCP sublayer (terminated in aGW on the network side) performs for the control plane the functions such as: Integrity Protection; Ciphering.

NAS (terminated in aGW on the network side) performs among other things: SAE bearer management; Authentication; Idle mode mobility handling; Paging origination in LTE_IDLE; Security control for the signaling between aGW and UE, and for the user plane.

RRC uses the following states:

1. RRC_IDLE:

UE specific DRX configured by NAS; Broadcast of system information; Paging; Cell re-selection mobility; The UE shall have been allocated an id which uniquely identifies the UE in a tracking area; No RRC context stored in the eNB.

2. RRC_CONNECTED:

UE has an E-UTRAN-RRC connection; UE has context in E-UTRAN; E-UTRAN knows the cell which the UE belongs to; Network can transmit and/or receive data to/from UE; Network controlled mobility (handover); Neighbour cell measurements; At RLC/MAC level: UE can transmit and/or receive data to/from network; UE also reports channel quality information and feedback information to eNB.

The network signals UE specific paging DRX (Discontinuous Reception) cycle. In RRC Idle mode, UE monitors a paging at a specific paging occasion of every UE specific paging DRX cycle. The paging occasion is a time interval where a paging is transmitted. UE has its own paging occasion. A paging message is transmitted over all cells belonging to the same tracking area. If UE moves from a tracking area to another tracking area, UE will send a tracking area update message to the network to update its location.

A physical channel transfers signaling and data between UE L1 and eNB L1. As shown in FIG. 5, the physical channel transfers them with a radio resource which consists of one or more sub-carriers in frequency and one more symbols in time. 6 or 7 symbols constitute one sub-frame which is 0.5 ms in length. The particular symbol(s) of the sub-frame, e.g. the first symbol of the sub-frame, can be used for the PDCCH (Physical Downlink Control Channel). PDCCH channel carries L1 signaling.

A transport channel transfers signaling and data between L1 and MAC layers. A physical channel is mapped to a transport channel.

Downlink transport channel types are:

1. Broadcast Channel (BCH) used for transmitting system information
2. Downlink Shared Channel (DL-SCH) characterised by: support for HARQ; support for dynamic link adaptation by varying the modulation, coding and transmit power; possibility to be broadcast in the entire cell; possibility to use beamforming; support for both dynamic and semi-static resource allocation
3. Paging Channel (PCH) used for paging a UE
4. Multicast Channel (MCH) used for multicast or broadcast service transmission.

Uplink transport channel types are:

1. Uplink Shared Channel (UL-SCH) characterised by: possibility to use beamforming; (likely no impact on specifications); support for dynamic link adaptation by varying the transmit power and potentially modulation and coding; support for HARQ
2. Random Access Channel(s) (RACH) used normally for initial access to a cell.

The MAC sublayer provides data transfer services on logical channels. A set of logical channel types is defined for different kinds of data transfer services as offered by MAC. Each logical channel type is defined by what type of information is transferred.

A general classification of logical channels is into two groups:

Control Channels (for the transfer of control plane data);
Traffic Channels (for the transfer of user plane data).

Control channels are used for transfer of control plane data only. The control channels offered by MAC are:

Broadcast Control Channel (BCCH)
A downlink channel for broadcasting system control information
Paging Control Channel (PCCH)
A downlink channel that transfers paging information. This channel is used when the network does not know the location cell of the UE.
Common Control Channel (CCCH)
this channel is used by the UEs having no RRC connection with the network.
Multicast Control Channel (MCCH)
A point-to-multipoint downlink channel used for transmitting MBMS control data from the network to the UE.
Dedicated Control Channel (DCCH)
A point-to-point bi-directional channel that transmits dedicated control data between a UE and the network. Used by UEs having an RRC connection.

Traffic channels are used for the transfer of user plane data only. The traffic channels offered by MAC are:

Dedicated Traffic Channel (DTCH)
A Dedicated Traffic Channel (DTCH) is a point-to-point channel, dedicated to one UE, for the transfer of user data. A DTCH can exist in both uplink and downlink.
Multicast Traffic Channel (MTCH)
A point-to-multipoint downlink channel for transmitting traffic data from the network to the UE.

In Uplink, the following connections between logical channels and transport channels exist:

DCCH can be mapped to UL-SCH;
DTCH can be mapped to UL-SCH.

In Downlink, the following connections between logical channels and transport channels exist:

BCCH can be mapped to BCH;
PCCH can be mapped to PCH;
DCCH can be mapped to DL-SCH;
DTCH can be mapped to DL-SCH;
MCCH can be mapped to MCH;
MTCH can be mapped to MCH;

Conventionally, only one carrier (e.g. a frequency band) is used at a time with respect to a given UE for transporting data, such as useful data and/or control data.

But for supporting wider transmission bandwidths, it would be better to use carrier aggregation, that is simultaneous support of multiple carriers. Carrier aggregation would thus involve transporting data, such as useful data and/or control data, over a plurality of carriers with respect to a given UE. It would thus enhance the conventional carrier usage and be adapted to the multiple access type of the considered radio communication system.

As far as LTE is concerned, carrier aggregation has been introduced in a recent version thereof, so-called LTE-Advanced, which extends LTE Release 8 (LTE Rel-8). Some aspects of carrier aggregation are disclosed for example in 3GPP TR 36.814 V0.4.1, 3rd Generation Partnership Project; Technical Specification Group Radio Access Network; Further Advancements for E-UTRA Physical Layer Aspects (Release 9) released in February 2009 (see section 5 in particular), as well as in subsequent versions thereof. Other standard documents, which are well known by one skilled in the art, relate to other aspects of carrier aggregation.

Thus LTE-Advanced allows having two or more carriers, so-called component carriers (CCs), aggregated in order to support wider transmission bandwidths e.g. up to 100 MHz and for spectrum aggregation.

In contrast with an LTE Rel-8 terminal, an LTE-Advanced terminal with reception and/or transmission capabilities for carrier aggregation can simultaneously receive and/or transmit on multiple component carriers.

According to a non-limiting example, a carrier may be defined by a bandwidth and a center frequency. If five carriers are assigned as granularity of carrier unit having a 5 MHz bandwidth, carrier aggregation may lead to a bandwidth of a maximum of 20 MHz.

Contiguous spectrum aggregation and/or non-contiguous spectrum aggregation may take place. The contiguous spectrum aggregation uses contiguous carriers and the non-contiguous spectrum aggregation uses discontiguous carriers. The number of aggregated carriers may be different in uplink and downlink. When the number of downlink carriers and that of uplink carriers are equal, it is called a symmetric aggregation, and when the numbers are different, it is called an asymmetric aggregation.

The size (i.e., the bandwidth) of multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

FIG. 6 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate e.g. in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control data such as HARQ ACK/NAK in response to downlink transmission, scheduling request and channel quality indicator (CQI). A physical uplink shared channel (PUSCH) carries uplink shared channel (UL-SCH).

Each component carrier may have its own control channel, i.e. PDCCH. Alternatively, only some component carriers may have an associated PDCCH, while the other component carriers do not have their own PDCCH.

Component carriers may be divided into a primary component carrier (PCC) and one or several secondary component carriers (SCCs) depending on whether they are activated. A PCC refers to a component carrier that is constantly activated, and an SCC refers to a component carrier that is activated or deactivated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The UE generally uses only a single PCC and possibly one or more SCCs along with the PCC.

A PCC is a component carrier used by a BS to exchange traffic and PHY/MAC control signaling (e.g. MAC control messages) with a UE. SCCs carriers are additional component carriers which the UE may use for traffic, only per BS's specific commands and rules received e.g. on the PCC. The PCC may be a fully configured carrier, by which major control data is exchanged between the BS and the UE. In particular, the PCC is configured with PDCCH. The SCC may be a fully configured component carrier or a partially configured component carrier, which is allocated according to a request of the UE or according to an instruction of the BS. The PCC may be used for entering of the UE into a network or for an allocation of the SCC. The primary carrier may be selected from among fully configured component carriers, rather than being fixed to a particular component carrier. A component carrier set as an SCC carrier may be changed to a PCC.

A PCC may further have at least some of the following characteristics:

to be in accordance with the definitions of the PCC introduced in Rel-10 CA;

uplink PCC and downlink PCC may be configured per UE;

uplink PCC may be used for transmission of L1 uplink control data;

downlink PCC cannot be de-activated;

re-establishment may be triggered when the downlink PCC experiences RLF (radio link failure), not when other downlink CC's experience RLF;

SI (system information) reception for the downlink PCC, Rel-8 procedures may apply;

this may not imply anything for the reception of the SI of other configured CC's;

NAS information may be taken from the downlink PCC cell.

The Rel-8 DRX procedures (when carrier aggregation is not implemented) define UE PDCCH monitoring requirements. Those requirements are defined in particular in the technical specification 3GPP TS 36.321 V8.8.0 (2009-12), 3rd Generation Partnership Project; Technical Specification Group Radio Access Network; Evolved Universal Terrestrial Radio Access (E-UTRA) Medium Access Control (MAC) protocol specification (Release 8).

In particular, 3GPP TS 36.321 V8.8.0 defines an Active Time, within a DRX cycle and related to DRX operation, as a time during which the UE monitors the PDCCH in PDCCH-subframes (see section 3.1).

The total duration of the Active Time is driven by several timers. Three main timers can be identified, namely: on-duration timer, an inactivity timer and a retransmission timer (or HARQ RTT timer). Other timers may be taken into account such as: longDRX-Cycle, drxStartOffset, drxShortCycleTimer and/or shortDRX-Cycle.

As shown schematically on FIG. 7, the minimum Active Time is of length equal to on-duration (reference 300) and the maximum Active Time includes in addition the duration of two timers (reference 301): the time when the UE is performing continuous reception while the inactivity timer has not expired and the time when the UE is waiting for a DL retransmission after of HARQ RTT timer has expired.

DISCLOSURE OF INVENTION

Technical Problem

The concept of PDCCH monitoring as explained above is however not adapted to support carrier aggregation for LTE-A, when multiple component carriers are used.

Extending the PDCCH monitoring defined in Rel-8 to a carrier aggregation situation is not an easy task, in particular in view of the fact that a PDCCH configured with respect to a given component carrier, for example a PCC, may schedule resources on a physical shared channel on this given component carrier but also, alternatively or in addition, on another component carrier, for example an SCC.

Solution to Problem

To improve this situation, the invention proposes a selective discontinuous reception method on multiple Component Carriers, CCs, for a User Equipment, UE, at least one CC being configured with a Physical Downlink Control Channel, PDCCH, received from a base station of a radiocommunication network and arranged for scheduling resources on a physical shared channel to the UE on said at least one CC respectively and/or on at least one other CC, each CC having a respective active time within a discontinuous reception cycle during which the UE monitors or would monitor the reception of a PDCCH on said CC respectively if said CC is or was configured with a PDCCH, the method comprising:

a determination step for determining whether at least one CC is configured with a PDCCH arranged for scheduling resources on at least one other CC;

a discontinuous reception method selection step depending on an output of the determination step, in which:

a) if at least one CC is configured with a PDCCH arranged for scheduling resources on at least one other CC which is not configured with a PDCCH, adjusting the active time of said at least one CC to the longest active time of said at least one CC and said at least one other CC; and b) otherwise, each CC being configured with a PDCCH arranged for scheduling resources only on said CC respectively, maintaining active times independent of each other for all CCs respectively.

According to optional aspects which may be combined in any possible manner:

determining whether at least one CC is configured with a PDCCH arranged for scheduling resources on at least one other CC in the determination step results from determining whether a PDCCH configured on said at least one CC includes a Carrier Indication Field, CIF; and/or before the determination step is performed, the UE first attempts to decode a PDCCH on every CC and to determine whether a decoded PDCCH includes a CIF field; and/or the UE receives an activation command from the base station, said activation command allowing data communication on at least one CC and indicating whether said at least one CC is configured with a PDCCH; and/or the active time maintained for each CC depends on a group of timers run by the UE with respect to said CC respectively; and/or said group of timers includes at least one of an on-duration timer, an inactivity timer and a retransmission timer; and/or each CC is configured with the same timer values, at least one of the timers being run independently upon CC activation in case b); and/or each CC which is configured with a PDCCH is part of a primary CC, PCC, set or of a secondary CC, SCC, set; and/or each CC which is not configured with a PDCCH is part of a secondary CC, SCC, set.

The invention also proposes a User Equipment, UE, arranged for implementing a selective discontinuous reception method on multiple component carriers, CCs, as mentioned above, at least one CC being configured with a Physical Downlink Control Channel, PDCCH, received from a base station of a radiocommunication network and arranged for scheduling resources on a physical shared channel to the UE on said at least one CC respectively and/or on at least one other CC, each CC having a respective active time within a discontinuous reception cycle during which the UE monitors or would monitor the reception of a PDCCH on said CC respectively if said CC is or was configured with a PDCCH. The UE comprises:

a determination unit for determining whether at least one CC is configured with a PDCCH arranged for scheduling resources on at least one other CC;

a discontinuous reception method selection unit for performing the following actions depending on an output of the determination unit:

if at least one CC is configured with a PDCCH arranged for scheduling resources on at least one other CC which is not configured with a PDCCH, adjusting the active time of said at least one CC to the longest active time of said at least one CC and said at least one other CC; and otherwise, each CC being configured with a PDCCH arranged for scheduling resources only on said CC respectively, maintaining active times independent of each other for all CCs respectively.

The invention also proposes a system including a base station and a UE as mentioned above.

In this system, the base station may be arranged for sending an activation command to the UE, said activation command allowing data communication on at least one CC and indicating whether said at least one CC is configured with a PDCCH.

The invention also proposes a selective discontinuous reception method on multiple Component Carriers, CCs, for a User Equipment, UE, at least one CC being configured with a Physical Downlink Control Channel, PDCCH, received from a base station of a radiocommunication network and arranged for scheduling resources on a physical shared channel to the UE on said at least one CC respectively and/or on at least one other CC, each CC having a respective active time within a discontinuous reception cycle during which the UE monitors or would monitor the reception of a PDCCH on said CC respectively if said CC is or was configured with a PDCCH, the method comprising:

detecting whether each CC (among all aggregated CCs) is a PDCCH monitoring CC, i.e. whether it is configured with a PDCCH, and whether it is associated with at least one non-PDCCH monitoring CC, i.e. whether it is arranged for scheduling resources on one or several non-PDCCH monitoring CCs;

maintaining active times independent of each other for all CCs detected as PDCCH monitoring CCs; and adjusting the active time of each CC detected as a PDCCH monitoring CC associated with at least one non-PDCCH monitoring CC to the longest active time between its own active time and the active time of its associated PDCCH monitoring CC(s) (so that it remains in active time when at least one of its associated non-PDCCH monitoring CC is in active time).

The invention also proposes a corresponding UE and a corresponding system. The advantageous features mentioned above, as well as any combination thereof, may also apply to this method.

Advantageous Effects of Invention

Such selective discontinuous reception method offers many advantages by differentiating the situations of whether or not a CC is configured with a PDCCH arranged for scheduling resources on at least another CC. If a CC is configured with a PDCCH arranged for scheduling resources on at least another CC, adjusting the active time of said CC to the longest active time between its own active time and the active time of the other CC(s) avoids missing relevant scheduling data for any of those CCs. And if each CC is configured with a PDCCH arranged for scheduling resources only on itself, maintaining independent active times for the CCs avoids a waste of battery life, because the monitoring time of each PDCCH is limited to what is strictly necessary.

BEST MODE FOR CARRYING OUT THE INVENTION

The invention will be described hereafter in the context of an LTE-A system supporting carrier aggregation as mentioned above. It applies however to any other type of system including at least one base station and at least one UE or equivalent, as will be apparent to one skilled in the art.

Figure 9:
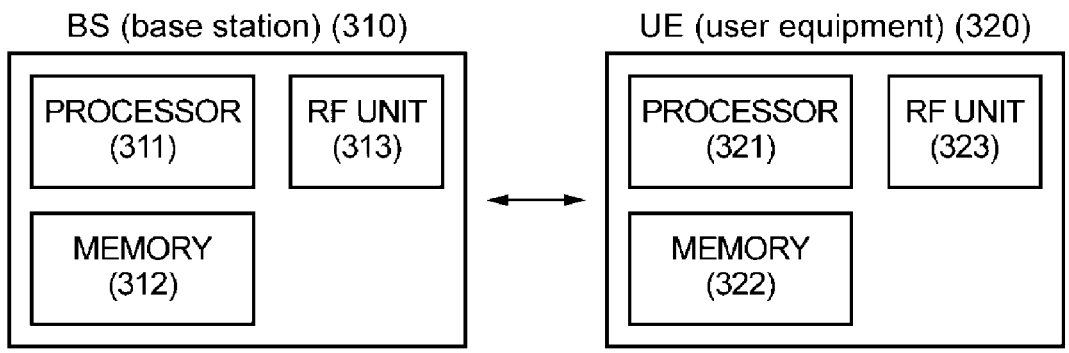
FIG. 9 is a diagram showing an exemplary and non-limiting wireless communication system according to an embodiment of the present invention.

FIG. 9 shows an exemplary and non-limiting wireless communication system including a BS 310 and one or more UE(s) 320. In downlink, a transmitter may be a part of the BS 310, and a receiver may be a part of the UE 320. In uplink, a transmitter may be a part of the UE 320, and a receiver may be a part of the BS 310. The BS 310 may include a processor 311, a memory 312, and a radio frequency (RF) unit 313. The processor 311 may be configured to implement proposed procedures and/or methods described in the present document. In the exemplary system of FIG. 9, the memory 312 is coupled with the processor 311 and stores a variety of information to operate the processor 311. The RF unit 313 is coupled with the processor 311 and transmits and/or receives a radio signal.

The UE 320 may include a processor 321, a memory 322, and a RF unit 323. The processor 321 may be configured to implement proposed procedures and/or methods described in the present document. The memory 322 is coupled with the processor 321 and stores a variety of information to operate the processor 321. The RF unit 323 is coupled with the processor 321 and transmits and/or receives a radio signal.

The BS 310 and/or the UE 320 may have single antenna or multiple antennas. When at least one of the BS 310 and the UE 320 has multiple antennas, the wireless communication system may be called a multiple input multiple output (MIMO) system.

The BS 310 and the UE 320 support carrier aggregation, meaning that they may use multiple component carriers (CCs).

Among the multiple CCs, one or several CCs is/are configured with a Physical Downlink Control Channel, PDCCH, received by the UE 320 from the BS 310. The PDCCH configured on a given CC may be arranged for scheduling resources on a physical shared channel, e.g. a PDSCH or PUSCH, to the UE 320 on said given CC only. Alternatively, it may be arranged for scheduling resources on a physical shared channel, e.g. a PDSCH or PUSCH, to the UE 320 on at least one other CC among the multiple CCs (only or in addition to scheduling resources on a physical shared channel on said given CC).

Irrespective of whether a given CC among the multiple CCs is configured or not with a PDCCH, it has a respective active time within a discontinuous reception (DRX) cycle as defined above. If the given CC is configured with its own PDCCH, the respective active time is the time during which the UE actually monitors the reception of this PDCCH on said given CC. Otherwise, if the given CC is not configured with its own PDCCH (but relies on a PDCCH of another CC), the respective active time is the time during which the UE would monitor the reception of a PDCCH on said given CC if such PDCCH was configured on it. This means that even when no PDCCH is configured on a CC, timers, such as an on-duration timer, an inactivity timer and/or a retransmission timer (or HARQ RTT timer), may still be run by the UE on this CC to determine an active time for (fictive) monitoring.

In contrast with the above-mentioned DRX method implemented in Rel-8, the present invention relates to a selective DRX method in the context of multiple CCs. In other words, the DRX method will not be identical depending on whether or not at least one CC is configured with a PDCCH arranged for scheduling resources on at least one other CC.

To this end, the UE 320 incorporates a determination unit which determines whether at least one CC, among the multiple aggregated CCs, is configured with a PDCCH arranged for scheduling resources on at least one other CC. It also incorporates discontinuous reception method selection unit to select one out of two DRX methods depending on an output of the determination unit. Both the determination unit and the discontinuous reception method selection unit may cooperate with or be at least in part included in the processor 321 and/or the memory 322 and/or the RF unit 323.

Determining, with respect to the UE 320, whether at least one CC is configured with a PDCCH arranged for scheduling resources on at least one other CC (or on the contrary whether each CC is configured with a PDCCH arranged for scheduling resources only on said CC respectively i.e. on itself) may be carried out in any possible way.

As an example, this determination may result from determining whether a PDCCH configured on said at least one CC includes a corresponding indication, such as a Carrier Indication Field, CIF. Such CIF field is defined in LTE-A standards, e.g. in the above-mentioned 3GPP TR 36.814.

To this end, before the determination is performed, the UE 320 may first attempt to decode a PDCCH on every CC among the multiple CCs mentioned above, and to determine whether a decoded PDCCH includes a CIF field.

In another example, which may be used alternatively or in addition to the above example, the determination may result from the UE 320 receiving an activation command from the BS 310, the activation command allowing data communication on at least one CC and indicating whether said at least one CC is configured with a PDCCH. In other words, the information of whether a CC is configured with a PDCCH or not is signaled to the UE 320 from the BS 310. This solution relies on signalling whether an activated CC is a PDCCH monitoring CC or not (the CC before to be activated/active state is configured first, i.e. no PDCCH and PDSCH transmitted). Other messages than an activation command may be used alternatively or in addition to the activation command.

In still another example, each CC which is configured with a PDCCH may be part of a primary CC, PCC, set or of a secondary CC, SCC, set. Also, each CC which is not configured with a PDCCH may be part of a secondary CC, SCC, set only.

Depending on the output of the above-mentioned determination of whether at least one CC is configured with a PDCCH arranged for scheduling resources on at least one other CC, a discontinuous reception method selection is performed. According to this selection:

a) if at least one CC is configured with a PDCCH arranged for scheduling resources on at least one other CC which is not configured with a PDCCH, the active time of said at least one CC is adjusted to the longest active time of said at least one CC and said at least one other CC; and b) otherwise, each CC being configured with a PDCCH arranged for scheduling resources only on said CC respectively, active times are maintained independent of each other for all CCs respectively.

Let us first consider case a), where at least one CC is configured with a PDCCH arranged for scheduling resources on at least one other CC which is not configured with a PDCCH. This case may correspond to a situation where the PDCCH on a CC can assign PDSCH or PUSCH resources in one of multiple CCs using the carrier indicator field (CIF).

For example, let us consider the following two CCs only: CC2 is designated as a PDCCH-monitoring CC for the UE 320, while CC1 is designated as a non-PDCCH monitoring CC for the UE 320 and CC1 is associated with CC2 in terms of PDCCH assignment. The PDCCH transmitted on CC2 assigns PDSCH and PUSCH resources on CC1 and CC2 to the UE 320. In this example, even if data transmission or retransmission on CC2 is finished and the corresponding active time (e.g. determined by its own DRX related timers) is expired, the CC2 may need to be extended its own active time. Thus CC2 remains in active time when CC1 is in active time.

Figure 1:
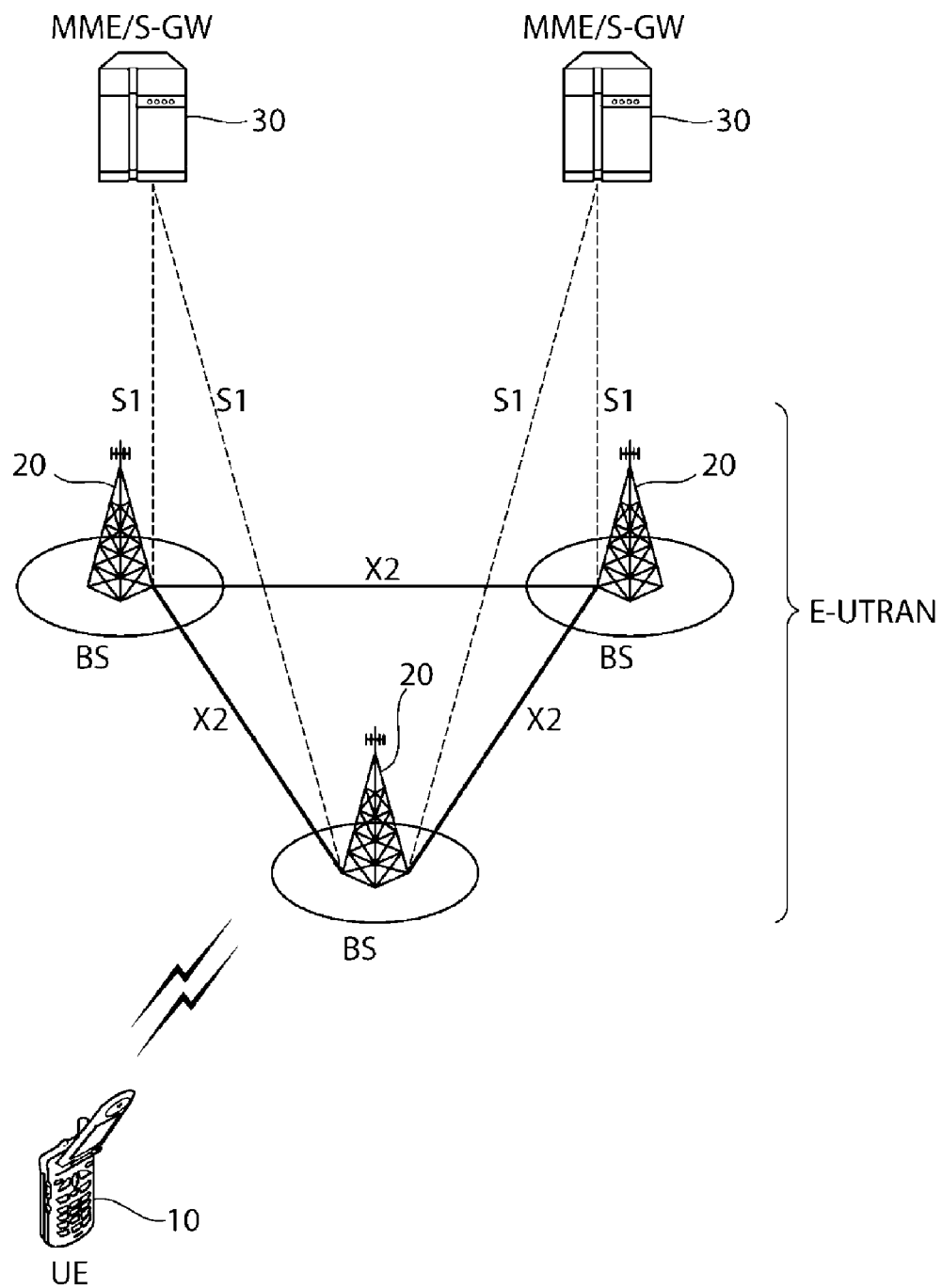
FIG. 1 is a diagram showing an exemplary radiocommunication system.
Figure 2:
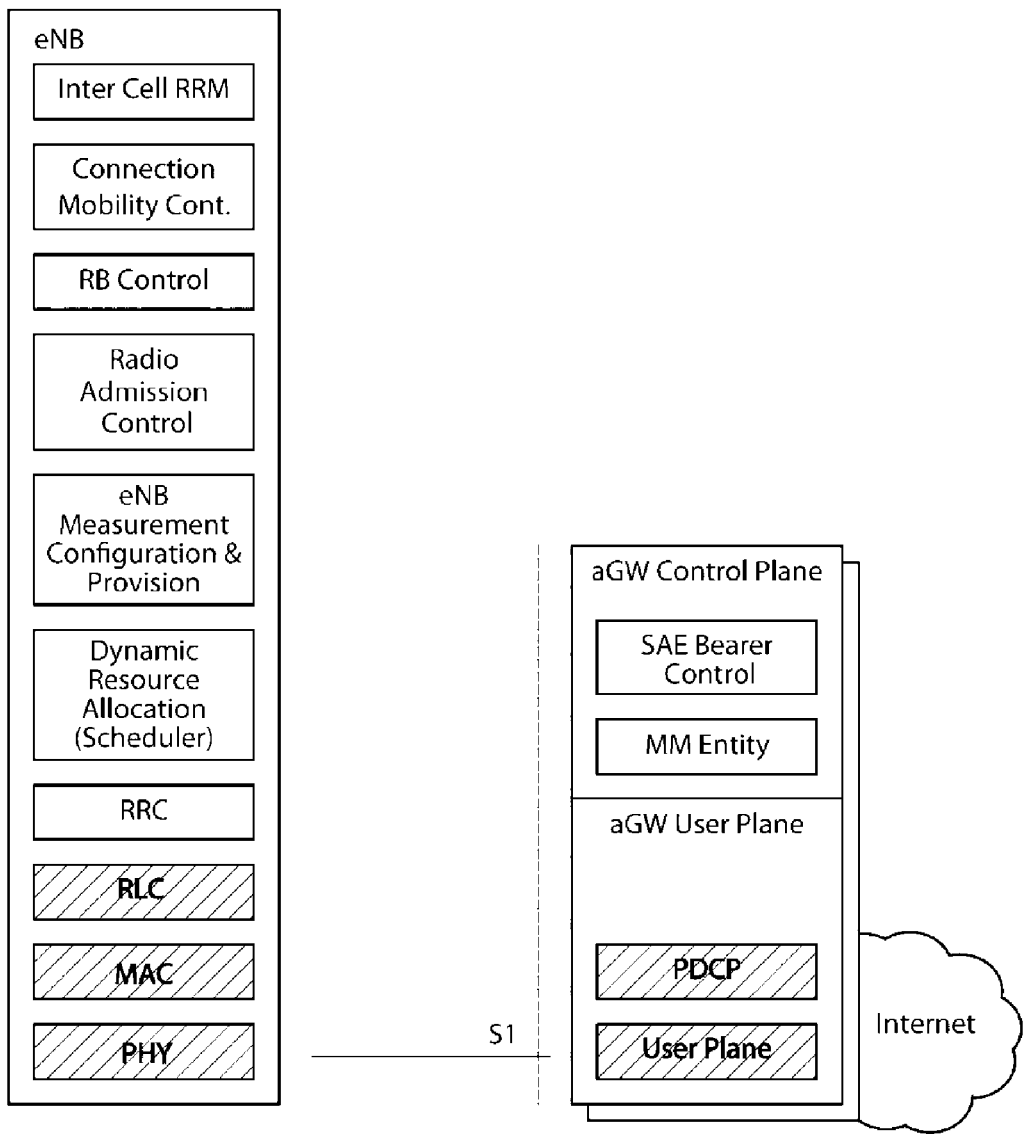
FIG. 2 is a diagram showing an exemplary overview of an E-UTRAN architecture.
Figure 3:
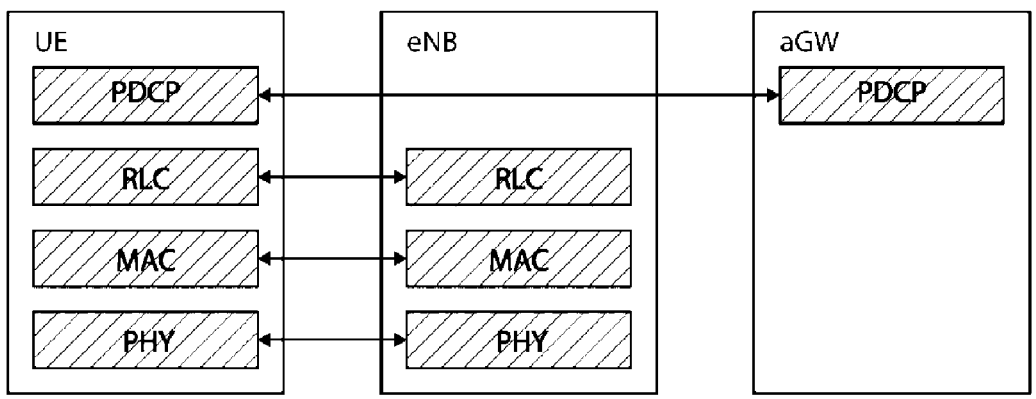
FIG. 3 is a diagram showing an exemplary user-plane protocol stack for E-UTRAN.
Figure 4:
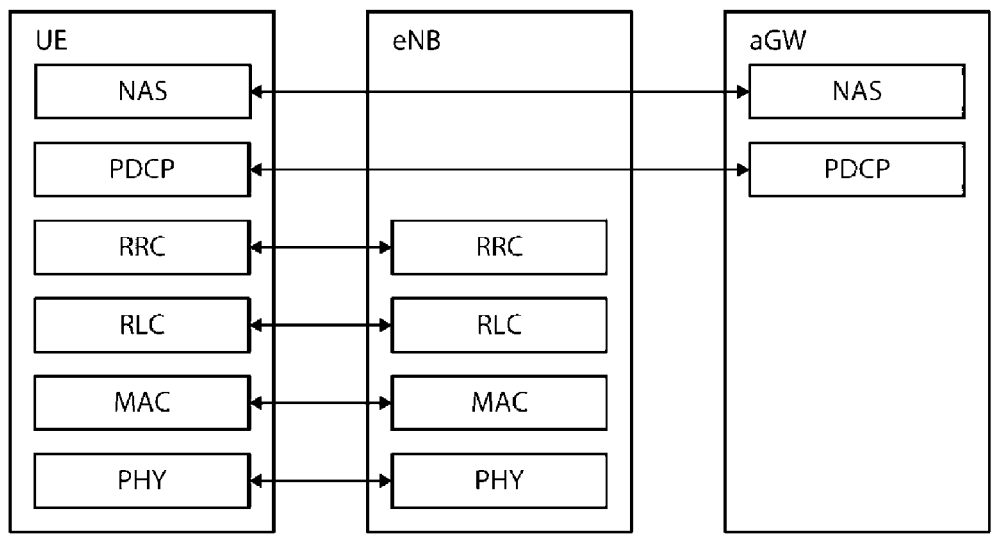
FIG. 4 is a diagram showing an exemplary control-plane protocol stack for E-UTRAN.
Figure 5:
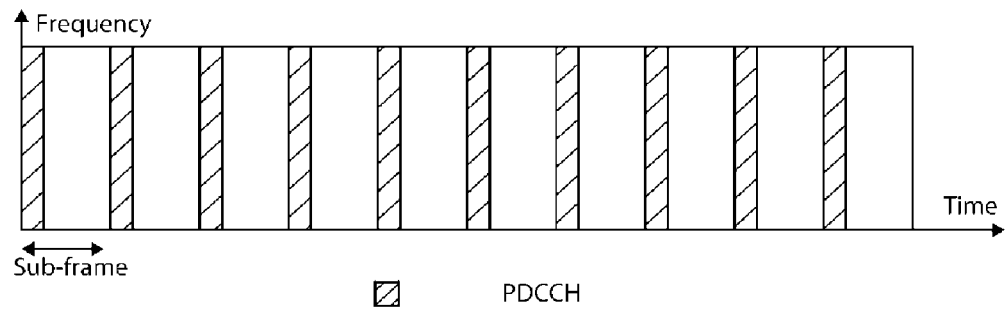
FIG. 5 is a diagram schematically showing a PDCCH channel arrangement.
Figure 6:
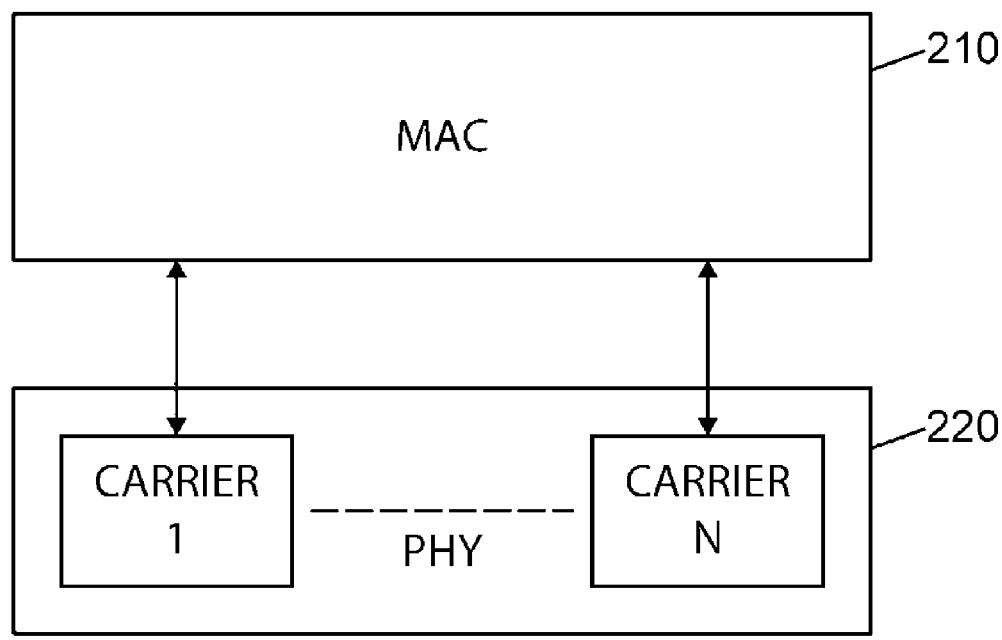
FIG. 6 is a diagram showing an exemplary protocol structure for supporting multiple carriers (carrier aggregation)
Figure 7:
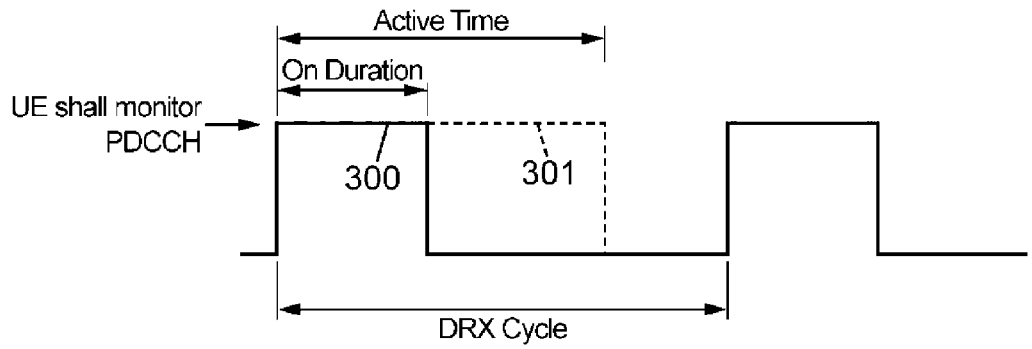
FIG. 7 is a diagram showing DRX operation in a non carrier aggregation situation.
Figure 8:
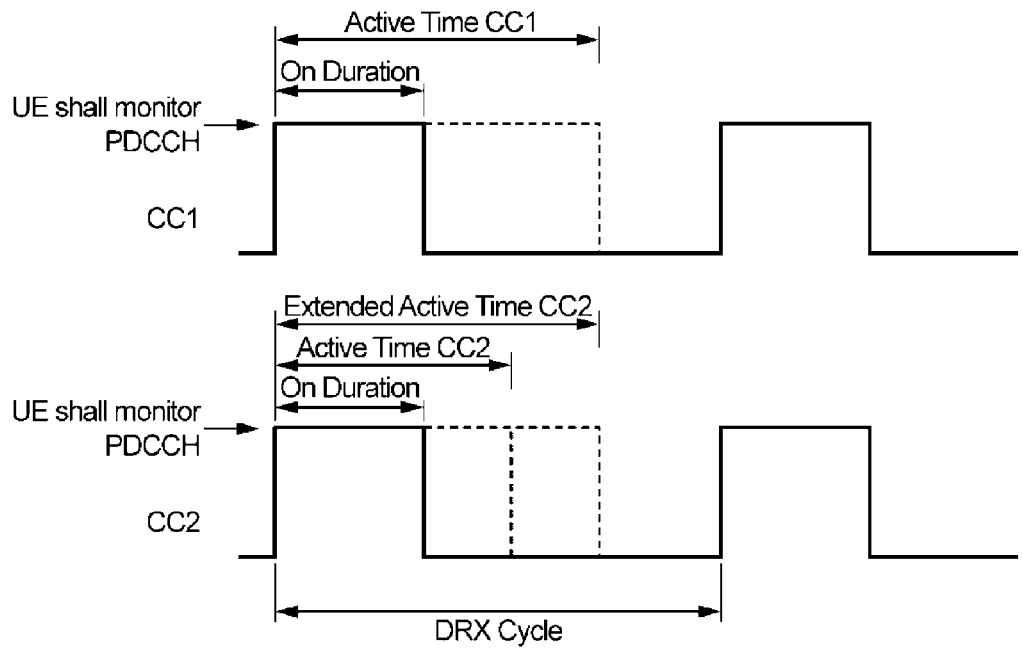
FIG. 8 is a diagram showing DRX operation in a carrier aggregation under certain circumstances according to an embodiment of the present invention.

This situation is illustrated in FIG. 8, where the active time of CC2 is extended to the longer active time of CC1. In contrast, if the active time of CC2 was longer than the active time of CC1, its duration would not be changed. In other words, the active time of CC2 is adjusted to the longest active time of CC1 and CC2.

Generalisation of this example is that the PDCCH-monitoring CC remains in active time when at least one of its associated non-PDCCH monitoring CC(s) is in active time, i.e. DRX timers (e.g. on-duration timer, inactivity timer and/or retransmission timer) of said non-PDCCH monitoring CC have not expired.

Applying this mode of operation to all CCs, by extending all active times to be identical to the longest active time would however not be optimum. Indeed, by doing so, other PDCCH monitoring CCs may need to extend their respective active times, e.g. due to HARQ retransmission on another CC, which would lead to unnecessary processing of PDCCH blind decoding, which would result in a proportional increase with the number of activated CCs.

To alleviate this effect, case b) proposes, for the CCs configured with a PDCCH arranged for scheduling resources only themselves respectively (no CIF used), to maintain active times independent of each other for those CCs respectively.

Maintaining independent active times for those CCs means that the rule for applying active time on each CC may be identical, but data transmission or retransmission on one CC only affects the active time on itself, i.e. each CC may have independent timers (e.g. on-duration timer, inactivity timer and/or retransmission timer).

Applying the active time independently on each active CC means that, for example, a HARQ retransmission on one CC would not impact the active time on other active CCs. This approach would keep the HARQ functionality independent between the different active CCs, i.e. there would not be a dependency between PDCCH monitoring on one CC and HARQ operation on another CC.

With respect to FIG. 8, this would imply keeping independent the active times of the two PDCCH monitoring CC1 and CC2, and thus not extending the active time of CC2 to the longer value of the active time of CC1.

As a starting point, the active time may be common among all activated CCs from the concept of the Common DRX (i.e. the DRX parameters are same) but the DRX related timers may be controlled independently among the CCs.

Let us consider a case where the active time maintained for each CC depends on a group of timers run by the UE 320 with respect to said CC respectively. Said group of timers may include for example an on-duration timer, an inactivity timer and a retransmission timer as defined above. Note that only one or two of those timers may be used. Also, other timers may be used alternatively or in addition to those timers. Each CC may be configured with the same timer values, at least one of the timers being run independently upon CC activation in case b).

In this scenario, maintaining independent active times for the CCs considered in case b) may imply having independent on-duration timers, inactivity timers and retransmission timers for those CCs. This would allow some CCs to be turned off when the UE needs to monitor a subset of the CCs configured for PDCCH monitoring. It would be beneficial for example if PDCCH reception is not required during on durations of each DRX Cycle on all activated CCs.

Alternatively, only a subset of on-duration timer, an inactivity timer and a retransmission timer may be maintained independently of each other for the considered CCs. As an example, the on-duration timer may be the same for all the CCs and be used as a common UE-eNB synchronisation point in time, at which the UE 320 can be scheduled.

Thanks to the implementation of case b), unnecessary PDCCH monitoring can be avoided, which results in saving the battery life of the UE 320.

The concept of the present invention may also apply as follows when multiple aggregated CCs are used between a base station and a User Equipment:

detecting whether each CC (among all aggregated CCs) is a PDCCH monitoring CC, i.e. whether it is configured with a PDCCH, and whether it is associated with at least one non-PDCCH monitoring CC, i.e. whether it is arranged for scheduling resources on one or several non-PDCCH monitoring CCs;

maintaining active times independent of each other for all CCs detected as PDCCH monitoring CCs; and adjusting the active time of each CC detected as a PDCCH monitoring CC associated with at least one non-PDCCH monitoring CC to the longest active time between its own active time and the active time of its associated PDCCH monitoring CC(s) (so that it remains in active time when at least one of its associated non-PDCCH monitoring CC is in active time).

For illustration purpose, let us consider a case where carrier aggregation involves three CCs: CC1, CC2 and CC3. CC1 and CC3 are each configured with a respective PDCCH. In contrast, CC2 is not configured with a respective PDCCH and relies on the PDCCH of CC1 for resource scheduling on CC2. In this scenario, the active times of CC1 and CC3 may be run independently, but the active times of CC1 may be adjusted to the longest of the active times of CC1 and CC2.

INDUSTRIAL APPLICABILITY

Other embodiments may be envisaged within the framework of the present invention, as will be apparent to one skilled in the art.

The invention claimed is:

1. A selective discontinuous reception method on multiple component carriers, CCs, for a User Equipment, UE, at least one CC being configured with a Physical Downlink Control Channel, PDCCH, received from a base station of a radio-communication network and arranged for scheduling resources on a physical shared channel to the UE on said at least one CC respectively and/or on at least one other CC, each CC having a respective active time within a discontinuous reception cycle during which the UE monitors or would monitor the reception of a PDCCH on said CC respectively if said CC is or was configured with a PDCCH, the method comprising:

a determination step for determining whether at least one CC is configured with a PDCCH arranged for scheduling resources on at least one other CC;

a discontinuous reception method selection step depending on an output of the determination step, in which:

a) if at least one CC is configured with a PDCCH arranged for scheduling resources on at least one other CC which is not configured with a PDCCH, adjusting the active time of said at least one CC to the longest active time of said at least one CC and said at least one other CC; and b) otherwise, each CC being configured with a PDCCH arranged for scheduling resources only on said CC respectively, maintaining active times independent of each other for all CCs respectively.

2. The method as claimed in claim 1, wherein determining whether at least one CC is configured with a PDCCH arranged for scheduling resources on at least one other CC in the determination step results from determining whether a PDCCH configured on said at least one CC includes a Carrier Indication Field, CIF.

3. The method as claimed in claim 2, wherein, before the determination step is performed, the UTE first attempts to decode a PDCCH on every CC and to determine whether a decoded PDCCH includes a CIF field.

4. The method as claimed in claim 1, wherein the UE receives an activation command from the base station, said activation command allowing data communication on at least one CC and indicating whether said at least one CC is configured with a PDCCH.

5. The method as claimed in claim 1, wherein the active time maintained for each CC depends on a group of timers run by the UE with respect to said CC respectively.

6. The method as claimed in claim 5, wherein said group of timers includes at least one of an on-duration timer, an inactivity timer and a retransmission timer.

7. The method as claimed in claim 5, wherein each CC is configured with the same timer values, at least one of the timers being run independently upon CC activation in case b).

8. The method as claimed in claim 1, wherein each CC which is configured with a PDCCH is part of a primary CC, PCC, set or of a secondary CC, SCC, set.

9. The method as claimed in claim 1, wherein each CC which is not configured with a PDCCH is part of a secondary CC, SCC, set.

10. A User Equipment, UE, arranged for implementing a selective discontinuous reception method on multiple component carriers, CCs, according to any one of the foregoing claims, at least one CC being configured with a Physical Downlink Control Channel, PDCCH, received from a base station of a radiocommunication network and arranged for scheduling resources on a physical shared channel to the UE on said at least one CC respectively and/or on at least one other CC, each CC having a respective active time within a discontinuous reception cycle during which the UE monitors or would monitor the reception of a PDCCH on said CC respectively if said CC is or was configured with a PDCCH, the UE comprising:

a determination unit for determining whether at least one CC is configured with a PDCCH arranged for scheduling resources on at least one other CC;

a discontinuous reception method selection unit for performing the following actions depending on an output of the determination unit:

if at least one CC is configured with a PDCCH arranged for scheduling resources on at least one other CC which is not configured with a PDCCH, adjusting the active time of said at least one CC to the longest active time of said at least one CC and said at least one other CC; and otherwise, each CC being configured with a PDCCH arranged for scheduling resources only on said CC respectively, maintaining active times independent of each other for all CCs respectively.

* * * * *